Dec. 14, 1948.  A. H. LAMB  2,456,199

GENERATOR CONTROL SYSTEM

Filed Jan. 20, 1945

Inventor:
Anthony H. Lamb,

By Pierce + Schaffler,
Attorneys.

Patented Dec. 14, 1948

2,456,199

UNITED STATES PATENT OFFICE 2,456,199

GENERATOR CONTROL SYSTEM

Anthony H. Lamb, Hillside, N. J., assignor to Weston Electrical Instrument Corporation, Newark, N. J., a corporation of New Jersey Application January 20, 1945, Serial No. 573,667

7 Claims. (Cl. 171—119)

1

This invention relates to generator control systems and particularly to arrangements for the automatic regulation of two alternating current generators that are connected in parallel to a common load.

The invention has been employed for the control of generators on bomber aircraft but it may of course be applied to other parallel connected alternating current generators. The normal load during cruising flight of a bomber can be carried by a single alternating current generator but the load increases materially when additional equipment is brought into operation as the bomber approaches the target area. The single generator cannot maintain the normal line voltage when the load increases beyond some value, and a second alternating current generator is brought into operation to prevent this drop in the line voltage. Unfortunately, however, each generator may not carry its share of the load and, in some instances, one generator may actually reverse its function and operate as a motor, thereby increasing the load on the other generator. Such erratic operation counteracts all of the advantages that are theoretically attained by the introduction of the second generator and it is then preferable to operate on a single generator even though it is badly overloaded.

Objects of the invention are to provide automatic systems for parallel connected alternating current generators that will develop signals, either visible or audible or both, to indicate erratic generator operation. Another object is to provide control systems of the type stated that close relay circuits, when the load distribution varies by a preselected degree from equality, that cut out the least important part of the load or that remove one generator from the load line. More specifically, an object is to provide a control system for two parallel connected alternating current generators that includes a modulator bridge rectifier having one input circuit energized from the load line, a second input circuit energized in accordance with the difference in the current outputs of the two generators, and an output circuit including a zero center indicating instrument or relay.

These and other objects and advantages of the invention will be apparent from the following specification when taken with the accompanying drawings in which.

Figure 1:
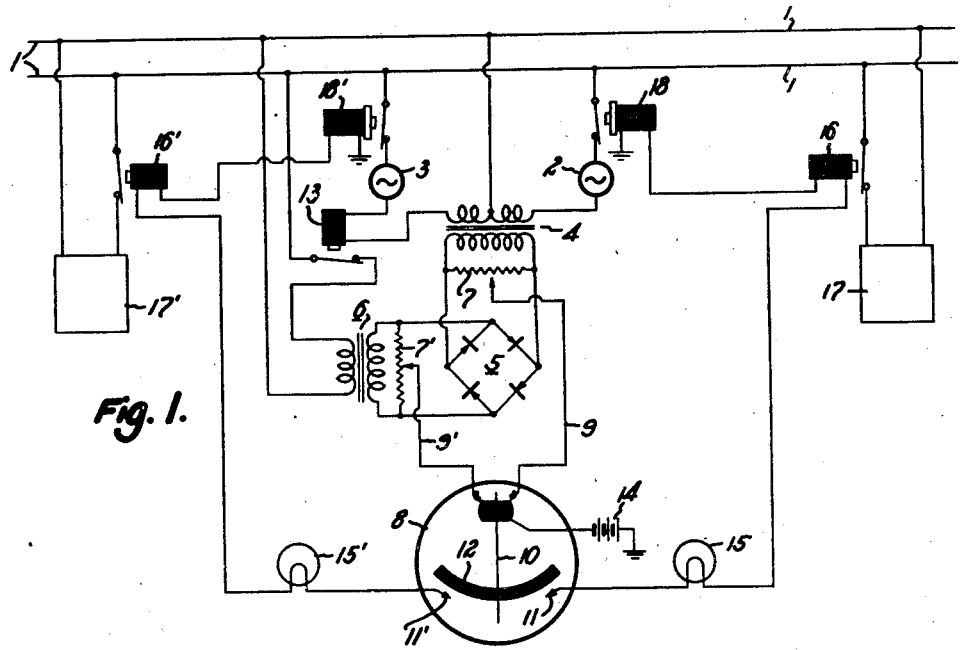
Fig. 1 is a simplified circuit diagram of an embodiment of the invention.

In both circuit diagrams, the reference numeral 1 identifies a load line across which alternating current generators 2, 3 are connected in parallel through the opposed primary windings of a transformer 4, the secondary winding being connected across an opposed set of terminals of a modulator bridge rectifier 5. The primary winding of a second transformer 6 is connected across the line 1, and its secondary winding is across the other set of opposed terminals of the bridge rectifier 5. Resistances 7, 7' are connected across the transformer secondary windings, and a direct current relay 8, Fig. 1, or direct current instrument 8', Fig. 2 is connected between the midpoints of resistances 7, 7' by leads 9, 9'.

The method of operation of the modulator bridge 5 and its associated circuits will be described by reference to the simplified Fig. 2 circuit before proceeding with the description of the several electrical elements of the control system of Fig. 1. The rectifier bridge 5 is energized by the current input from the transformer 6, i. e. alternate half-waves of the input alternating current flow through the pairs of serially connected rectifier arms that are in parallel across the secondary of the transformer 6. No part of this current flows through the secondary of the transformer 4 or through the instrument 8' when the bridge is balanced. The instrument 8' is of the "center zero" type, and its pointer therefore stands at its center or zero position when the current inputs to line 1 from the generators 2, 3 are equal, i. e. when there is no current input to the bridge from the transformer 4. A voltage is developed across the secondary of transformer 4 when the current outputs of the generators 2, 3 are unequal, and the path of the resulting current is determined by the conductivity of the several rectifier bridge arms in response to the energizing current from the transformer 6. Assuming that the instantaneous polarities of the secondary of the transformer 6 are as indicated by the legends "+", "—" of Fig. 2, the resulting current will take the path shown by the solid line arrows. The two rectifiers at the right side of the bridge 5 are thus rendered conductive. An unequal load distribution that develops a voltage of the indicated polarity across the secondary of the transformer 4 will result in a current through the lower right bridge arm and the measuring circuit 8, 9, 9' as indicated by the dotted line arrows. Inspection of the bridge and associated network will show that, upon the half-cycle reversal of the alternating voltages developed by the transformers 4, 6, the current from transformer 4 flows in the same direction in the measuring circuit, i. e. from lead 9' to instrument 8', and back to the transformer secondary through lead 9 and the righthand section of the resistance 7. Upon a reversal of the relative magnitudes of the current outputs of the generators 2, 3, the polarity of the current input from transformer 4 reverses, and the direction of the rectified current in the measuring circuit also reverses. The direction of displacement of the instrument pointer is thereby reversed upon a change in the sense of the inequality of the current outputs, and the extent of the pointer displacement varies with the magnitude of the inequality of the current outputs of the generators 2, 3. The direct current established in the measuring circuit may be employed, upon the substitution of a relay for the measuring instrument 8', to control the generator system.

Figure 2:
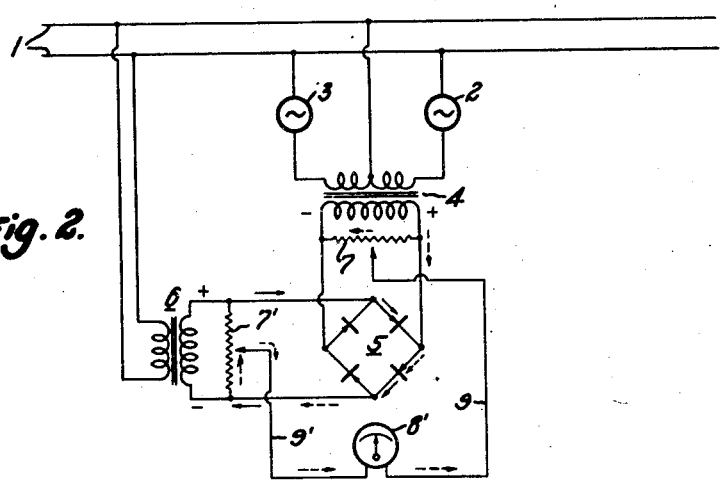
Fig. 2 is an equivalent schematic diagram of the basic elements of the Fig. 1 control circuit.

Reverting now to the Fig. 1 circuit, the current responsive device in the direct current measuring circuit is an instrument type relay 8 having a pointer or contact arm 10 movable between opposed stationary contacts 11, 11'. If desired, the relay 8 may have a window opening for viewing the position of the relay pointer 10 along a scale 12. The scale 12 has a central range of one color, for example green, corresponding to inequality of generator current outputs of up to about 10% of the maximum load, and end ranges of another color, for example red, corresponding to about a 15% departure of the generator current outputs from equality.

In the illustrated circuit, the generator 2 is adapted to carry the normal, relatively low load during the point to point flight of the bomber, and the second generator 3 is energized by automatic or manually actuated means, not shown, when the load increases as the bomber nears the target area. The control system is energized when the supplemental generator 3 is connected to the load line 1 through the relay 13 that is in series with the generator 3 and has contacts for closing the circuit to the primary winding of the bridge input transformer 6. The controlled relay circuits include a current source 14 connected between the reay pointer or contact arm 10 and ground, and similar circuits between the relay contacts 11, 11' and ground. The sense of operation of the relay 8 is such that the contact arm 10 engages the contact 11 when the generator 2 fails to carry its share of the load, and engages the contact 11' when the generator 3 fails to carry its share of the load. The contact 11 is connected through a visual alarm device 15 to a quick-acting relay 16 having normally closed contacts completing a circuit to a load element 17, and a slow-acting relay 18 having normally closed contacts completing the circuit connection of the generator 2 to the load line 1. Corresponding elements in the relay circuit of contact 11' are identified by primed reference numerals.

The generators 2, 3 are both connected to the load line 1 so long as the current outputs of the generators differ by not more than a selected fraction, for example 10%, of the total load. If and when the current contribution of one generator rises or falls to a dangerous value with respect to the current contribution of the other generator, the relay contact arm 10 closes upon the relay contact 11 or 11', depending upon the sense of the inequality of current distribution.

If, for example, the current output of generator 2 drops off to a dangerous value, the contact arm 10 closes on the contact 11 to energize the relays 16 and 18. Relay 16 operates immediately to remove the load device 17 from the line 1, and this reduction of load may or may not result in a better approximation to equality of the current outputs of the two generators. If normal, approximately equal sharing of the load results, the contact arm 10 leaves the contact 11 and the load device 17 is again energized. If the removal of the load device 17 does not restore the desired balance, the contact arm 10 remains in engagement with the contact 11 and the slow-acting relay 18 operates to disconnect the faulty generator 2 from the load line 1. Similarly, if the current output of generator 3 drops to a predetermined amount, the contact arm 10 closes on the contact 11' to energize the relays 16' and 18'.

It is to be understood that the invention is not restricted to a particular field of use and that various changes that may occur to those familiar with the art of automatic generator regulation fall within the spirit of my invention as set forth in the following claims.

I claim:

1. In an alternating current system of the type including a pair of generators connected in parallel to a load line, a modulator bridge rectifier having an input circuit energized from said load line, a conjugate input circuit for impressing upon said bridge rectifier a current that varies in sense and magnitude with the departure of the current outputs of said generators from equality, and a direct current measuring circuit connected across said bridge rectifier, said measuring circuit including a zero center current responsive device.

2. In an alternating current system, the invention as recited in claim 1 wherein said current responsive device comprises a relay having a contact arm and cooperating stationary contact means, in combination with circuits controlled by said relay.

3. In an alternating current system, the invention as recited in claim 1 wherein said current responsive device comprises a relay having a contact arm and cooperating stationary contact means, in combination with circuits controlled by said relay and including relay means for isolating a part of the load from said load line.

4. In an alternating current system, the invention as recited in claim 1 wherein said current responsive device comprises a relay having a contact arm and cooperating stationary contact means, in combination with circuits controlled by said relay and including relay means for opening the circuit connections between one of said generators and said load line.

5. In an alternating current system, the invention as recited in claim 1 wherein said current responsive device comprises a relay having a contact arm and cooperating stationary contact means, in combination with circuits controlled by said relay and including relay means of different time-responsive characteristics for first removing a part of the load from the load line and thereafter opening the circuit connections between one of said generators and said load line.

6. In an alternating current system, a load line, a generator normally connected to said load line, a second generator to be connected to said load line, a control system responsive to variations in the sense and magnitudes of the current inputs to said load line from said generators, and means responsive to a current input to the load line from said second generator to complete an energizing circuit for said control system.

7. In an alternating current system, the invention as recited in claim 6 wherein said control system includes a modulator bridge rectifier, and an energizing circuit for said bridge rectifier having switch contacts therein controlled by a relay in series circuit with said second generator.

ANTHONY H. LAMB.

REFERENCES CITED

The following references are of record in the file of this patent:

UNITED STATES PATENTS

| Number | Name | Date |
| --- | --- | --- |
| 1,568,474 | Schmidlin | Jan. 5, 1926 |
| 1,948,912 | Geyger | Feb. 27, 1934 |
| 1,860,166 | Bany | May 24, 1932 |
| 2,213,099 | Adorjan | Aug. 27, 1940 |
| 2,324,188 | Beetem | July 13, 1943 |
| 2,360,068 | Martindell | Oct. 10, 1944 |